United States Patent
Ler et al.

(10) Patent No.: US 10,966,031 B2
(45) Date of Patent: Mar. 30, 2021

(54) METHOD FOR CHARGING A HEARING DEVICE, HEARING DEVICE SYSTEM, HEARING DEVICE AND CHARGING UNIT

(71) Applicant: SIVANTOS PTE. LTD., Singapore (SG)

(72) Inventors: Gee Heng Ler, Penang (MY); Chee Kong Siew, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 16/431,901

(22) Filed: Jun. 5, 2019

(65) Prior Publication Data
US 2019/0394575 A1 Dec. 26, 2019

(30) Foreign Application Priority Data
Jun. 22, 2018 (DE) .......................... 102018210205.8

(51) Int. Cl.
*H04R 25/00* (2006.01)
*H02J 7/02* (2016.01)

(52) U.S. Cl.
CPC .............. *H04R 25/00* (2013.01); *H02J 7/025* (2013.01); *H04R 2225/31* (2013.01)

(58) Field of Classification Search
CPC ...... H04R 25/00; H04R 2225/31; H02J 7/025
See application file for complete search history.

(56) References Cited

U.S. PATENT DOCUMENTS

| | | | |
|---|---|---|---|
| 8,577,479 B2 | 11/2013 | Wakamatsu | |
| 9,941,742 B2 | 4/2018 | Park | |
| 2009/0285426 A1* | 11/2009 | Boguslavskij | H04R 25/554 381/323 |
| 2010/0278367 A1* | 11/2010 | Huttinger | H04R 25/558 381/315 |
| 2012/0197347 A1 | 8/2012 | Olson et al. | |
| 2014/0241557 A1* | 8/2014 | Martius | H02J 50/80 381/323 |
| 2015/0177330 A1* | 6/2015 | Morris | H02J 5/005 320/106 |
| 2019/0052979 A1* | 2/2019 | Chen | H04R 1/1025 |

FOREIGN PATENT DOCUMENTS

| | | |
|---|---|---|
| JP | 2009268310 A | 11/2009 |
| JP | 2018506949 A | 3/2018 |
| WO | 2016205373 A1 | 12/2016 |

* cited by examiner

*Primary Examiner* — Sunita Joshi
(74) *Attorney, Agent, or Firm* — Laurence A. Greenberg; Werner H. Stemer; Ralph E. Locher

(57) ABSTRACT

A method for charging a hearing device uses a charging unit configured for wireless charging. A query signal is emitted wirelessly by a transmitter of the charging unit. Upon receipt of the query signal a first response signal is sent to the charging unit by a response unit of the hearing device. Upon the receipt of the first response signal the charging unit begins a charging operation for the hearing device, by wirelessly emitting a continuous energy signal. A hearing device system, a hearing device and a charging unit are also provided.

11 Claims, 3 Drawing Sheets

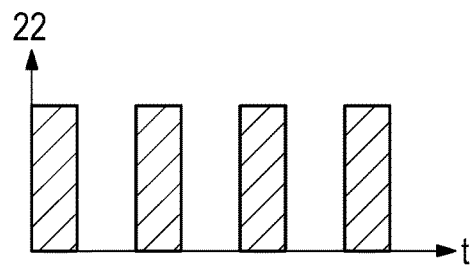
FIG. 3
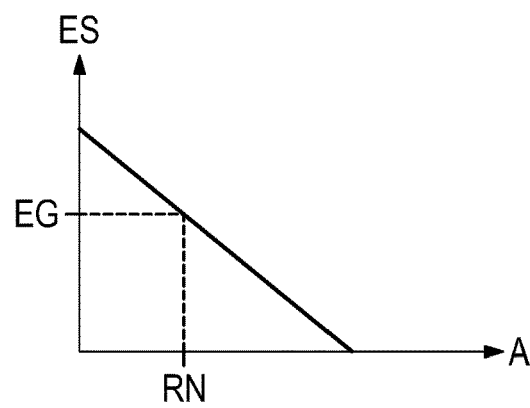
FIG. 4
FIG. 5
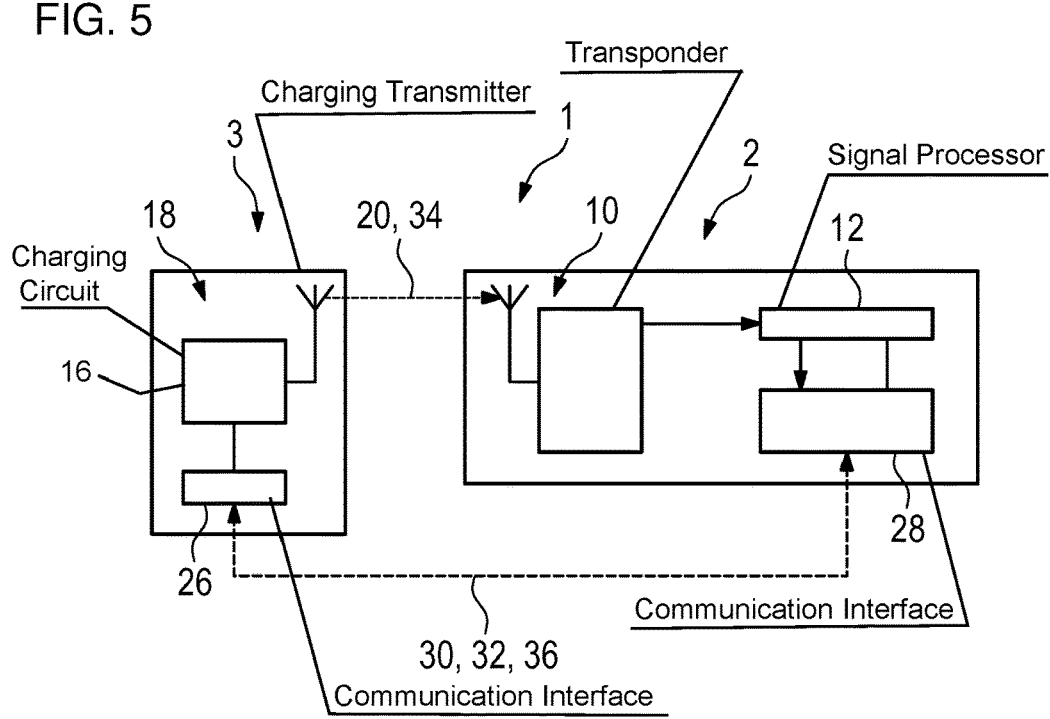

METHOD FOR CHARGING A HEARING DEVICE, HEARING DEVICE SYSTEM, HEARING DEVICE AND CHARGING UNIT

CROSS-REFERENCE TO RELATED APPLICATION

This application claims the priority, under 35 U.S.C. § 119, of German application DE 10 2018 210 205.8, filed Jun. 22, 2018; the prior application is herewith incorporated by reference in its entirety.

BACKGROUND OF THE INVENTION

Field of the Invention

The invention relates to a method for charging a hearing device, in particular by using a charging unit configured for wireless charging. The invention further relates to a hearing device system, which is configured to carry out the charging method. The invention additionally relates to a hearing device and a charging unit, which are configured for use in the hearing device system.

Hearing devices are commonly used for outputting an audio signal to the auditory system of the wearer of the hearing device. The output is effected by using an output transducer, usually over an acoustic path using airborne sound by using a loudspeaker (also known as a "receiver"). Hearing devices of that kind are also frequently used as so-called hearing aid devices (also referred to simply as hearing aids). When used for that purpose the hearing devices usually include an acoustic input transducer (in particular a microphone) and a signal processor, which is configured to process the input signal (or microphone signal) generated by the input transducer from the detected ambient noise using at least one signal processing algorithm, which is typically stored and/or adapted on a user-specific basis, in such a way that a hearing loss of the wearer of the hearing device is at least partially compensated. Particularly in the case of a hearing aid device, the output transformer in addition to a loudspeaker can also alternatively be a so-called bone conduction receiver or a cochlear implant, which are configured to provide mechanical or electrical coupling of the audio signal into the auditory system of the wearer. Hearing aid devices often come in the form of hearing aids to be worn at least partly behind the ear ("BTE"), as well as hearing aid devices to be worn fully or partially in the auditory canal (referred to simply as "in-ear"). The term hearing device also includes in particular devices such as so-called tinnitus maskers, headsets, headphones, and the like.

The power supply for the electronic components of the hearing device, for example the signal processor, the respective microphone, the loudspeaker and the like in conventional hearing devices, is frequently in the form of batteries which must be replaced on a regular basis. In modern hearing devices, however, rechargeable secondary cells (also referred to as accumulators) are also used. However, they need to be charged more frequently due to their usually comparatively lower energy density. Usually, the secondary cells, specifically a set of charging electronics associated with them, are electrically connected to a power source for charging. For waterproof hearing devices or for aesthetic reasons, charging electronics configured for wireless energy reception (for example, inductively) are also used. That allows contact points on a surface of the hearing device to be eliminated.

SUMMARY OF THE INVENTION

It is accordingly an object of the invention to provide a method for charging a hearing device, a hearing device system, a hearing device and a charging unit, which overcomes the hereinafore-mentioned disadvantages of the heretofore-known methods and devices of this general type and which improve the wireless charging function of a hearing device.

Advantageous embodiments and developments of the invention, some of which are inventive in themselves, are set out in the dependent claims and the following description.

With the foregoing and other objects in view there is provided, in accordance with the invention, a method for charging a hearing device by using a charging unit configured for wireless charging. In accordance with the method a transmitter of the charging unit is used to wirelessly emit a (in particular first) query signal. Through the use of a response unit (also referred to as a "receiver") of the hearing device, a first response signal is sent to the charging unit on receipt of the query signal. Upon receipt of the first response signal the charging unit begins a charging operation for the hearing device, by wirelessly emitting—preferably by using a "charging transmitter" of the charging unit—a continuous energy signal, which is used in particular to transfer a charging energy.

The above-mentioned query by the charging unit and the response of the hearing device enable an automatic commencement of the charging operation. However, a relatively energy-saving operation of the charging unit during a phase with no charging operation is also possible, since the continuous energy signal is only emitted following a response by the hearing device.

In order to further reduce the energy consumption, in particular outside of the charging mode, in a preferred method variant the query signal is emitted discontinuously, i.e. in particular in the form of individual "pulses."

In an advantageous method variant, the query signal is used for detecting whether the hearing device is located within a near field around the charging unit. A near field is taken to be an area of in particular less than 30 centimeters, preferably less than 10 centimeters around the charging unit, specifically around the charging transmitter of the charging unit. A response unit (receiver) of the hearing device is provided in particular by a transponder, having an operating energy which is preferably generated from the transmitted query signal (in particular in the form of an energy signal). Preferably, the transponder being used is constructed in the manner of an RFID transponder (also referred to as an RFID tag). This means that the receiver is activated by the energy contained in the query signal and also draws the energy for sending the response signal from the query signal. This means that it is advantageously possible to perform the charging operation even in the event that an energy storage device of the hearing device is discharged to such an extent that no available energy is left for it to send signals independently, at least within the near field described above, and therefore to wirelessly recharge the hearing device, specifically its energy storage device, even in such a severely discharged state since communication with the charging unit is enabled by the external energy supply. In this case, the transmitter of the charging unit is preferably formed by the charging transmitter itself. Therefore, both the first query signal and the continuous energy signal are emitted by the charging transmitter.

In particular in the case that the hearing device is located in the near field during the charging operation, a signal processing function of a signal processing processor (or simply a signal processor) of the hearing device is preferably kept inactive during the charging operation. At least, this signal processing function is held inactive until the energy storage device of the hearing device is sufficiently (re-)charged. To this end the hearing device preferably includes charging electronics, which "tap off" the energy transported in the continuous energy signal, convert it if required and feed it into the energy storage device. In addition, the charging electronics are configured to monitor the charging state of the energy storage device (i.e., the current energy content). The "inactive holding" of the signal processing function during the charging operation is advantageous in particular when charging in the near field, in that no unnecessary energy consumption takes place during the charging operation, and that when charging in the near field, in particular as a result of the comparatively short distance to the charging unit, the hearing device is usually not in use anyway.

In an alternative method variant the query signal is used for detecting whether the hearing device is located in a far field around the charging unit. A far-field is understood to mean an area around the charging unit, which in particular is more than 30 centimeters, preferably more than 50 centimeters distant from the charging unit, specifically from the transmitter of the charging unit. A response unit of the hearing device in this case is preferably provided by a communication interface, the operating energy of which is generated from a secondary cell of the hearing device to be charged. The communication interface in this case is in particular a transmitter, specifically an antenna with an associated transmit and receive controller, which is preferably configured for signal transmission in the radio frequency range, in particular at a frequency of approximately 2.4 Gigahertz. For example, this transmitter operates according to the Bluetooth standard. Accordingly, the charging unit, specifically its transmitter, is preferably also configured for communication in a corresponding frequency band. The transmitter in this method variant is constructed separately from the charging transmitter and represents a communication interface, which is constructed in a similar way to the hearing device. The (first) query signal in this case is preferably a "pure" communication signal, which in particular is not used for energy transmission. The response signal of the hearing device in this case preferably performs a kind of "handshake" between the charging unit and the hearing device.

In an advantageous extension of the method variant described above, in particular in the case that the hearing device is located in the far field around the charging unit, it is determined whether the hearing device is located within a far-field charging range around the charging unit. This is advantageous in particular to the extent that the far field, within which a communication between the charging unit and hearing device is possible by using the respective communication interfaces, does not fully coincide with the far-field charging range within which a wireless energy transfer is possible, at least from an energy-efficiency perspective. Thus, the far-field charging range is shorter than the range in which "mere" communication is possible. For example, the latter can be up to 5, 10, 15 meters or more in size, whereas an efficient wireless energy transfer is only possible up to a distance of 3 or 4 meters.

In particular, to determine whether the hearing device is located in the far-field charging range, the charging unit—in particular upon the reception of the response signal by the hearing device—firstly emits a pulsed energy signal. An (energy) receiver of the hearing device then determines whether sufficient energy is received from the pulsed energy signal to charge or to maintain the charge of the secondary cell. To this end, in particular the receiver converts the energy received signal into an electrical signal and checks—in particular, on the basis of at least one stored threshold value—whether the signal energy is sufficient for charging or maintaining the charge. If this is the case, the charging unit sends the energy signal in continuous form and thereby starts the charging operation. In this case, the hearing device first preferably sends a second response signal, which preferably contains the information that the hearing device is located within the far-field charging range, and the charging unit then starts the charging operation. This advantageously allows energy to be saved by the charging unit until the confirmation from the hearing device is received in the form of the second response signal.

In an optional method variant—in particular, for the case of the far-field charging operation described above—to start the (far-field) charging operation a user-initiated approval (in particular by using the hearing device) is requested from the user of the hearing device.

In particular in the case that the hearing device is not configured to communicate wirelessly with the charging unit, but is configured for (possibly) wireless communication with an electronic (communication) device, in particular a smartphone or the like, and is also coupled to this device for signal transmission, the first response signal is preferably forwarded by using this electronic device (in particular the smartphone). In this case, each response signal from the hearing device, and optionally also the query signal of the charging unit, is preferably forwarded by using this device. This is advantageous also in the case that the hearing device is already coupled to such an electronic device, for example the smartphone, and therefore in some circumstances no additional communication channel is available for the (direct) signal exchange with the charging unit.

Preferably, during the charging operation in the near field by using the respective energy signal a higher energy—in particular a higher charging current—is transferred than during the far-field charging operation.

More preferably, the charging in the near field is optionally carried out by induction, by using magnetic resonance or a radio transmission of energy (in particular by using frequencies in the range up to approximately microwave frequencies). In the far field the charging is preferably carried out by using magnetic resonance or the above radio transmission of energy.

Through the use of the far-field charging operation, which in particular can only be used for charging with comparatively low energy input into the secondary cell, advantageously, charging or at least maintaining a charge is possible during the continuing normal operation of the hearing device.

In a particularly advantageous method variant the charging unit and the hearing device are configured to carry out both methods described above jointly—i.e. in particular selectively. To this end, in particular, the charging unit sends the (first) query signal to detect whether the hearing device is located in the near field or in the far field around the charging device. In addition, the charging unit sends a second query signal to detect (in particular vice versa) whether the hearing device is located in the far field or in the near field around the charging device. Therefore, the charging unit preferably sends two different (in particular with regard to the signal properties) query signals and depending on the received response signal, activates either the near-field charging mode or the far-field charging mode.

In either case, the near-field charging mode is preferably activated by the charging unit itself if it is determined that the hearing device is located within the near field around the charging unit. This is because in this case, it can normally be assumed that the user of the hearing device has deliberately positioned it in close proximity to the charging unit.

In the case that the hearing device is located within the far-field charging range, before the activation of the far-field charging operation the user is optionally requested to enable the activation of the far-field charging operation.

With the objects of the invention in view, there is also provided a hearing device system which includes the charging unit described above and the hearing device described above. The latter is advantageously configured to be charged wirelessly in the near field and/or in the far field around the charging unit. Both the charging unit and the hearing device are configured to carry out the above method jointly.

With the objects of the invention in view, there is furthermore provided a hearing device configured for use in the hearing device system described above. In concrete terms, the hearing device is thus configured to be charged wirelessly in the near field and/or in the far field around the charging unit and to send the appropriate response signal upon receiving the corresponding query signal of the charging device.

With the objects of the invention in view, there is concomitantly provided a charging unit configured for use in the hearing device system described above. Accordingly, the charging unit is configured to wirelessly charge the hearing device described above in the near field or in the far field around the charging unit. In addition, the charging unit is preferably configured to emit the first query signal described above and also, where appropriate, the second query signal and to start the corresponding charging operation upon receipt of the corresponding response signal on the part of the hearing device.

Since the hearing device system according to the invention, the hearing device and the charging unit are configured and provided to carry out the method described above, they also have the respective physical features described in connection with the method and therefore also share the advantages of the method according to the invention.

The conjunction "and/or" in this case and in the following is to be understood, in particular, to mean that features linked by using this conjunction can be implemented both jointly and as alternatives to each other.

Other features which are considered as characteristic for the invention are set forth in the appended claims.

Although the invention is illustrated and described herein as embodied in a method for charging a hearing device, a hearing device system, a hearing device and a charging unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 3 and 4 are diagrams illustrating a part of the method carried out by the hearing device system;

FIG. 5 is a block circuit diagram of an alternative exemplary embodiment of the hearing device system in the view according to FIG. 2.

DETAILED DESCRIPTION OF THE INVENTION

Figure 1:
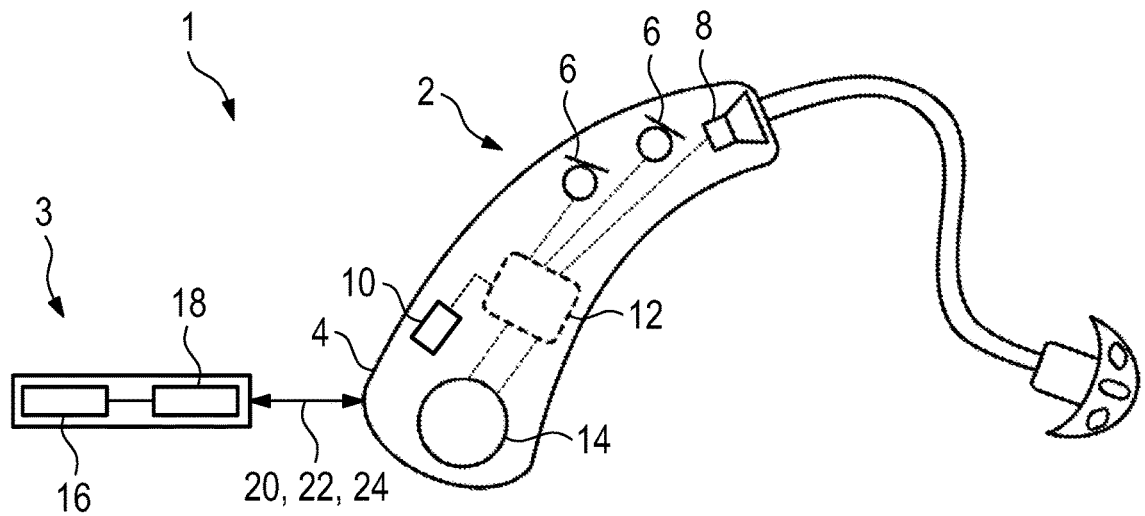
FIG. 1 is a diagrammatic, longitudinal-sectional view of a hearing device system.

Referring now in detail to the figures of the drawings, in which equivalent parts and dimensions are provided with identical reference numerals, and first, particularly, to FIG. 1 thereof, there is seen a diagrammatic illustration of a hearing device system 1. This system includes a hearing device, specifically a behind-the-ear hearing aid, which is designated for simplicity as a "hearing aid 2," and a charging unit 3. The hearing device 2 has a housing 4 with a plurality of electronic components accommodated therein, specifically two microphones 6, a loudspeaker 8, a transponder 10 and a signal processor 12. In order to supply energy for these components the hearing device 2 also includes a rechargeable battery (a so-called "secondary cell" which is designated for simplicity as a "battery pack 14"). In addition, the hearing aid 2 is also configured for wireless charging of the battery pack 14. The transponder 10 is used in this case for the wireless reception of (charge) energy (and is also designated as a "receiver"). The charging unit 3 includes a charging circuit 16, as well as a transmitter, in this case in the form of a "charging transmitter 18." The charging circuit 16 is configured to draw energy from an energy source, usually the local electricity mains or network, and to convert it into a form required for the wireless charging. The charging transmitter 18 is configured to detect the presence of the hearing aid 2 within a charging range and thereupon to activate a charging mode by emitting the charging energy in the form of an energy signal 20.

Figure 2:
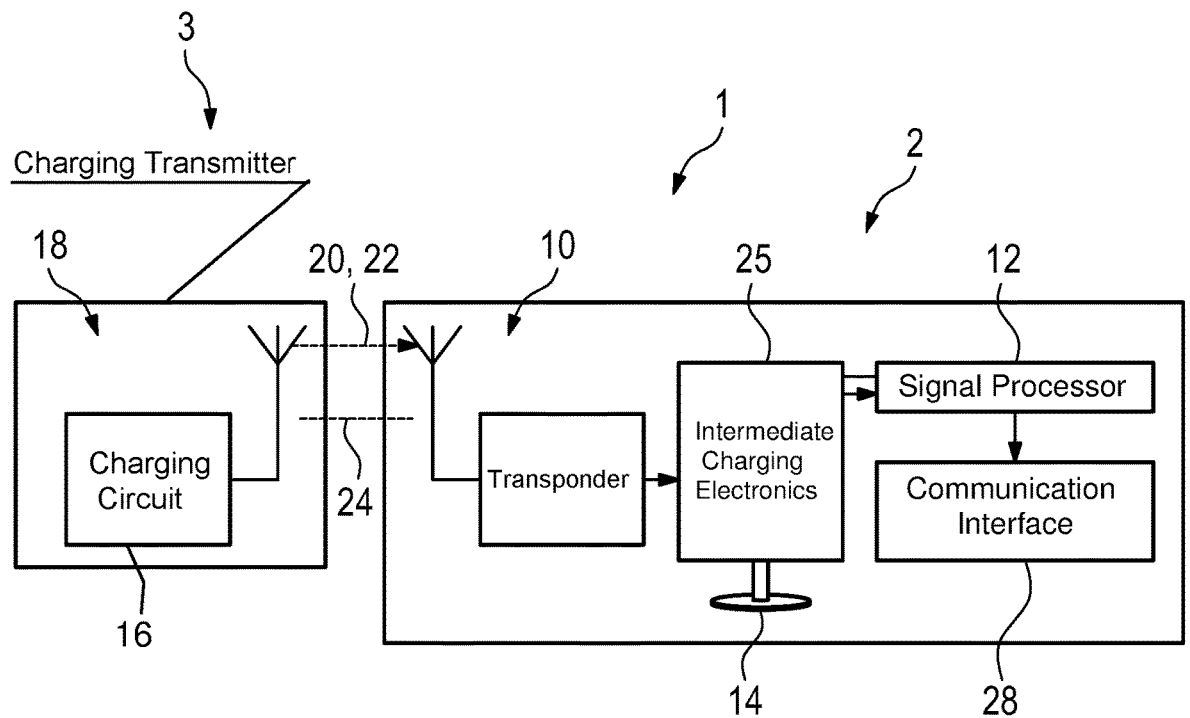
FIG. 2 is a block circuit diagram of an exemplary embodiment of the hearing device system.

FIG. 2 shows a first exemplary embodiment of the hearing device system 1. The charging unit 3, in this case, is a near-field charging unit, and is therefore configured to charge the hearing aid 2 within a near field, i.e. within a range of 10 centimeters around the charging unit 3. The charging unit 3 and the hearing aid 2 jointly carry out a method described in more detail below in order to charge the hearing device 2, specifically its battery pack 14.

In order to detect whether the hearing device 2 is located within the near field, the charging unit 3 using its charging transmitter 18 emits a discontinuous (first) query signal 22 (in the radio frequency range). In the event that the hearing aid 2 is positioned within the near field, its transponder 10 receives the query signal 22. The transponder 10 in this exemplary embodiment is constructed in the manner of an RFID tag, so that the transponder 10 draws an operating energy (for the transponder 10 itself) from the query signal 22. If this operating energy is sufficient for the operation of the transponder 10, the latter sends (back) a (first) response signal 24 to the charging unit 3. Thus, the transponder unit 10 represents a response unit of the hearing aid 2. Upon receiving the response signal 24, the charging unit 3 switches over into the charging mode and sends the energy signal 20 in continuous form.

FIG. 3 shows a timing diagram of the query signal 22. As is evident from FIG. 3, the query signal 22 is sent in the form of individual "energy pulses." As can also be seen from FIG. 4, signal energy ES of the query signal 22 that can be received by the transponder 10 falls with increasing distance A between the hearing aid 2 and the charging unit 3. In this case the transponder 10 is configured in such a way that the response signal 24 is sent if the operating energy that can be derived from the signal energy ES exceeds a limit EG, which is also sufficient for charging the battery pack 14. In this case, the hearing device 2 is also disposed within a specified near-field charging range RN (for example 10 centimeters).

In the exemplary embodiment according to FIG. 2, the transponder 10 and the battery pack 14 are connected through intermediate charging electronics 25. In optional exemplary embodiments these electronics 25 can be integrated in the transponder 10 or the signal processor 12.

FIG. 5 shows an alternative exemplary embodiment of the hearing device system 1. The charging unit 3 in this exemplary embodiment is a charging unit configured for wirelessly charging the hearing aid 1 within a so-called far field and is thus a far field charging unit. Far field in this case and in the following is defined as being a range between 30 centimeters and two meters. The charging unit 3 and the hearing aid 2 in this case are configured to communicate with each other by using short-range radio technology—for example, based on the Bluetooth standard. Appropriate communication interfaces 26 or 28 in the exemplary embodiment shown are implemented separately from the charging transmitter 18 or the transponder 10. The charging transmitter 18 or the transponder 10 in this case is configured only for transmitting the energy signal 20 (which is used to charge the battery pack 14) and/or its reception.

In an optional exemplary embodiment which, however, is not shown in detail, the communication interfaces 26 and/or 28 are integrated in the charging transmitter 18 or in the transponder 10.

In an optional exemplary embodiment, shown in FIG. 2, the hearing aid 2 includes the communication interface 28.

Figure 6:
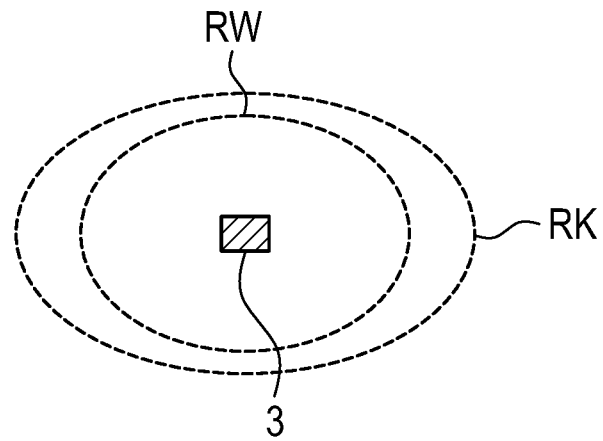
FIGS. 6 and 7 are diagrammatic plan views of areas around a charging unit of the hearing device system, within which a communication and/or a charging of the hearing device is possible.

In order to detect whether the hearing aid 1 is located within a far field—indicated in FIG. 6 by a region designated as RK which is a "communication range"—the charging device 3 sends a (second) query signal 30 (in the radio frequency range) through its communication interface 26 (which in this example is formed by the transmitter described above). If this signal is received by the operational hearing aid 2, specifically by its communication interface 28, the hearing aid 2 also responds through its communication interface 28 with a response signal 32. Thereupon the charging device 3 starts to emit a pulsed energy signal 34, using its charging transmitter 18. The pulsed energy signal 34 is received by the hearing device 2 by using the transponder 10 (which is therefore a receiver for the pulsed energy signal 34) and from this signal extracts operating energy for the hearing aid 2. In doing so the transponder 10 checks—for example, based on a threshold comparison—whether the operating energy that can be extracted from the pulsed energy signal 34 is sufficient to charge the battery pack 14 and/or to operate the signal processor 12.

If the transponder 10 determines that the operating energy extractable from the pulsed energy signal 34 is sufficient, the transponder 10 concludes that the hearing aid 2 is located within a far-field charging range RW around the charging unit 3. In this case, the transponder 10 forwards this information to the signal processor 12. This emits a corresponding confirmation signal 36 through the communication interface 28 of the hearing aid 2. Upon receipt of this confirmation signal 36 the charging unit 3 switches over into the charging mode and transmits the continuous energy signal 20 to the hearing aid 2.

In a further exemplary embodiment which is not shown, the hearing aid 2 uses a signal sent to the user of the hearing aid 2 to request the user's approval to start the charging operation. It is only after the approval by the user (e.g. by operating a switch or key on the hearing aid 2) that the confirmation signal 36 is sent to the charging unit 3.

The near-field charging mode is used for rapidly charging the battery pack 14 by a comparatively high charging current being transmitted through the energy signal 20. In the far-field charging mode, a comparatively low charging current is transmitted through the energy signal 20. In this case, the hearing aid 2, specifically the transponder 10 (by using charging electronics integrated into the transponder 10), uses this "far-field charging energy" to charge the battery pack 14 comparatively slowly, or at least to maintain its charge during operation of the hearing aid 2.

Figure 7:
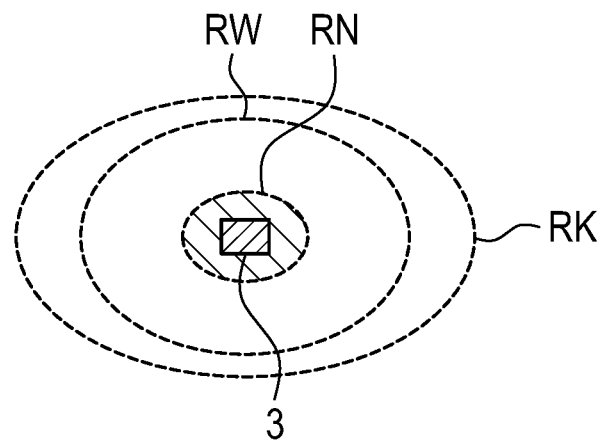

A further exemplary embodiment will be described in detail on the basis of FIG. 7. The charging unit 3 and the hearing aid 2 are in this case configured for charging in the near-field charging mode as well as in the far-field charging mode. For this purpose, the exemplary embodiments described on the basis of FIGS. 2 and 5 are both jointly integrated into the hearing device system 1. Therefore, using its charging transmitter 18 the charging unit 3 emits the first query signal 22 in the manner described above and emits the second query signal 30 by using the communication interface 26. Depending on the distance A from the hearing aid 2 to the charging unit 3, specifically whether the hearing aid 2 is located in the near-field charging range RN or in the far-field charging range RW, the charging unit 3 activates the near-field charging mode or the far-field charging mode.

The subject matter of the invention is not limited to the exemplary embodiments described above. On the contrary, further embodiments of the invention can be derived the above description by the person skilled in the art. In particular, the individual features of the invention and its structural variants described on the basis of the various exemplary embodiments can also be combined with each other in other ways.

The following is a summary list of reference numerals and the corresponding structure used in the above description of the invention.

LIST OF REFERENCE SIGNS 1 hearing device system
2 hearing device
3 charging unit
4 housing
6 microphone
8 loudspeaker
10 transponder
12 signal processor
14 battery pack
16 charging circuit
18 charging transmitter 20 energy signal
22 query signal
24 response signal
25 charging electronics
26 communication interface
28 communication interface
30 query signal
32 response signal
34 pulsed energy signal
36 response signal
A distance
ES signal energy
EG limit
RN near-field charging range
RW far-field charging range
RK communication range

The invention claimed is:

1. A method for wirelessly charging a hearing device, the method comprising the following steps:
   providing a charging unit configured for wireless charging;
   using a transmitter of the charging unit to wirelessly emit a query signal to detect whether the hearing device is located in a near field or a far field around the charging unit;
   using the charging unit to emit a second query signal to detect whether the hearing device is located in the far field or the near field around the charging unit;
   using a response unit of the hearing device to send a first response signal to the charging unit upon receipt of the query signal;
   using a communications interface as the response unit of the hearing device, the communications interface having an operating power extracted from a secondary cell of the hearing device to be charged; and
   using the charging unit to activate either a near-field charging mode or a far-field charging mode depending on a receipt of the response signal and to begin a charging operation for the hearing device by wirelessly emitting a continuous energy signal upon the receipt of the first response signal.

2. The method according to claim 1, which further comprises emitting the query signal discontinuously.

3. The method according to claim 1, which further comprises:
   using a transponder as the response unit of the hearing device, the transponder having an operating power extracted from the emitted query signal.

4. The method according to claim 1, which further comprises providing a signal processing processor of the hearing device, and keeping a signal processing function of the signal processing processor inactive during the charging operation.

5. The method according to claim 1, which further comprises:
   using the charging unit to emit a pulsed energy signal;
   using a receiver of the hearing device to identify whether sufficient energy is received from the pulsed energy signal to charge or maintain a charge of the secondary cell; and
   emitting the continuous energy signal if the energy is sufficient.

6. The method according to claim 1, which further comprises requesting a user-initiated approval from a user of the hearing device to start the charging operation.

7. The method according to claim 1, which further comprises forwarding the response signal by using an electronic device coupled with the hearing device for signal transmission.

8. The method according to claim 7, which further comprises using a smartphone as the electronic device.

9. A hearing device system, comprising:
   a hearing device;
   a charging unit configured for wireless charging, said charging unit including a transmitter for wirelessly emitting a query signal to detect whether said hearing device is located in a near field or a far field around said charging unit;
   said charging unit emitting a second query signal to detect whether said hearing device is located in the far field or the near field around said charging unit; and
   said hearing device configured to be wirelessly charged in at least one of the near field or the far field around said charging unit, said hearing device including a response unit for sending a response signal to said charging unit upon receipt of the query signal;
   said response unit being a communications interface having an operating power extracted from a secondary cell of the hearing device to be charged;
   said charging unit being configured to activate either a near-field charging mode or a far-field charging mode depending on a receipt of the response signal and to begin a charging operation for said hearing device by wirelessly emitting a continuous energy signal upon the receipt of the response signal.

10. A hearing device configured for use in the hearing device system according to claim 9.

11. A charging unit configured for use in the hearing device system according to claim 9.

* * * * *